(No Model.)
J. C. GOULD.
ANIMAL TRAP.
No. 472,213. Patented Apr. 5, 1892.
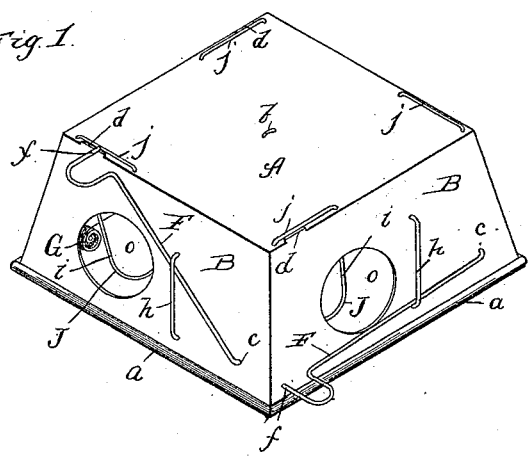
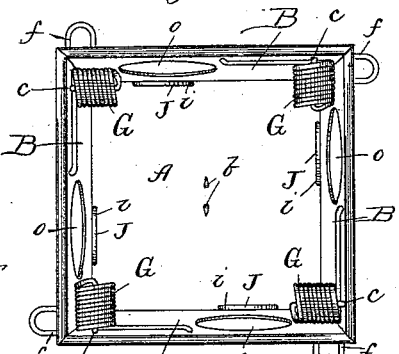
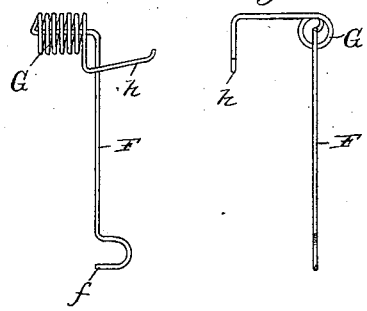
Witnesses:
Geo. E. Curtis
H. M. Munday
Inventor:
John C. Gould
By Munday, Evarts & Adcock
His Attorneys.
THE NORRIS PETERS CO., PHOTO-LITHO., WASHINGTON, D. C.

UNITED STATES PATENT OFFICE.

JOHN C. GOULD, OF CHICAGO, ILLINOIS, ASSIGNOR TO SUSAN I. GOULD, OF SAME PLACE.

ANIMAL-TRAP.

SPECIFICATION forming part of Letters Patent No. 472,213, dated April 5, 1892.

Application filed May 26, 1891. Serial No. 394,095. (No model.)

*To all whom it may concern:*

Be it known that I, JOHN C. GOULD, a citizen of the United States, residing at Chicago, in the county of Cook and State of Illinois, have invented a new and useful Improvement in Animal-Traps, of which the following is a specification.

This invention relates to a construction of animal-trap which is intended more especially as a substitute for the wood mouse-trap now commonly used. It is more easily set than the ordinary trap, and is very light, compact, durable, and cheap.

In Figure 1 I show a perspective of my improved trap, at Fig. 2 a bottom thereof, at Fig. 3 a vertical section, and at Figs. 4 and 5 I give detached views of the spring-catching or trip arm.

The body of the trap I form from sheet metal stamped into a box-like form. I illustrate in the drawings a four-sided trap, of which the top A and vertical walls B are formed in this manner from one piece of sheet metal. The bottom edge may be stiffened by turning over the metal, as shown at $a$, in the ordinary way of stiffening the edges of tinware. One bait-holder $b$, suspended in the center of the trap, suffices for all the entrance-openings and their trapping devices, which may be provided upon the vertical sides. The trap may be round or other form instead of square, and the number of entrances be increased or diminished as desired.

At each of the entrance-openings $o$ I provide the following devices for catching mice: F is a spring-depressed swinging-arm carrying at its free end a point $f$, adapted to engage with the upper corner of the trap-case when the trap is set, as shown at the left of Fig. 1. This arm moves across the entrance-opening when released from the set position, and in so doing it is caused to bear upon the neck of any mouse which may be nibbling at the entrance-opening. The pressure which this arm exerts is sufficient to hold the mouse from escape. The end of the arm opposite to that carrying the point $f$ is passed through the side of the case at $c$ and connected with a spring G, the part passing through the case serving as a pivot upon which the arm may swing. I prefer to make the arm and spring of one piece of wire, and have illustrated this construction in the drawings, the end of the arm being continued through the hollow of the spring to the farther side of the latter, as shown particularly at Fig. 4, in which figure the coils of the spring are somewhat spread for the purpose of showing this construction clearly. The farther end of the wire proceeding from the spring I pass out through the trap-case and, preferably, then extend it upwardly, as shown at $h$, so that it may serve as a loop or guide to confine the swinging arm in its movements and prevent its being bent in the mouse's struggle for life.

To dislodge the arm F, which may be properly called the "trip-arm," from its set position, I employ a lever device, which may also be formed of light wire. It is shown at J. One portion of it $i$ is bent into U form and is suspended inside the case immediately opposite the opening $o$ and in front of the bait, this position necessitating the swinging of the lever by any mouse which may seek to reach the bait. The other end of this lever J passes through the top of the trap, then horizontally over the same a short distance, and then downward with its end reversed, so as to secure it firmly. The horizontal portion J is pushed inward by the mouse, and in so doing bears against the point $f$ of the trip-arm and dislodges the latter from its set position. In this operation the top of the case serves as a fulcrum, and but slight movement of the lower part of the lever is requisite to produce it, so that it is as sensitive as the tripping devices of the ordinary trap.

At the corners of the trap where the point of the trip-arm rests when set I form, by preference, an edge or shoulder, as shown at $d$, which is adapted to prevent the trip from accidental dislodgement.

The trip-arm is shown at Figs. 4 and 5 ready for insertion. After insertion the part $h$ requires further bending.

I claim—

1. The animal-trap consisting of a hollow case having a single bait-holder at the center and a plurality of entrance-openings in its vertical walls and also provided with a trip and a trigger device at each opening, substantially as set forth.

2. The animal-trap consisting of a hollow case having an entrance-opening in its vertical wall, a bait-holder, a spring-depressed trip-arm moving across the entrance-opening and adapted to be set above the opening, and a swinging trigger device suspended between the opening and the bait and adapted when moved to release the trip-arm from its set position, substantially as specified.

3. In an animal-trap, a hollow case having an opening in its vertical wall, a trip-arm pivoted in the wall, a spring connected to said arm and adapted to depress the same forcibly, a bait-holder in front of the entrance-opening, and a lever or trigger placed between the opening and the bait and having a horizontal portion adapted to dislodge the trip-arm from its set position, substantially as set forth.

4. In an animal-trap, a swinging spring-depressed arm adapted to rest when set upon the upper corner of the trap, in combination with a swinging trigger device located between the entrance-opening and the bait and having a portion adapted when the trigger is moved by the animal to dislodge the trip-arm, substantially as specified.

JOHN C. GOULD.

Witnesses:
   H. M. MUNDAY,
   EMMA HACK.